May 24, 1960     E. V. MADES ET AL     2,937,560
OPTICAL SQUARE
Filed May 5, 1955
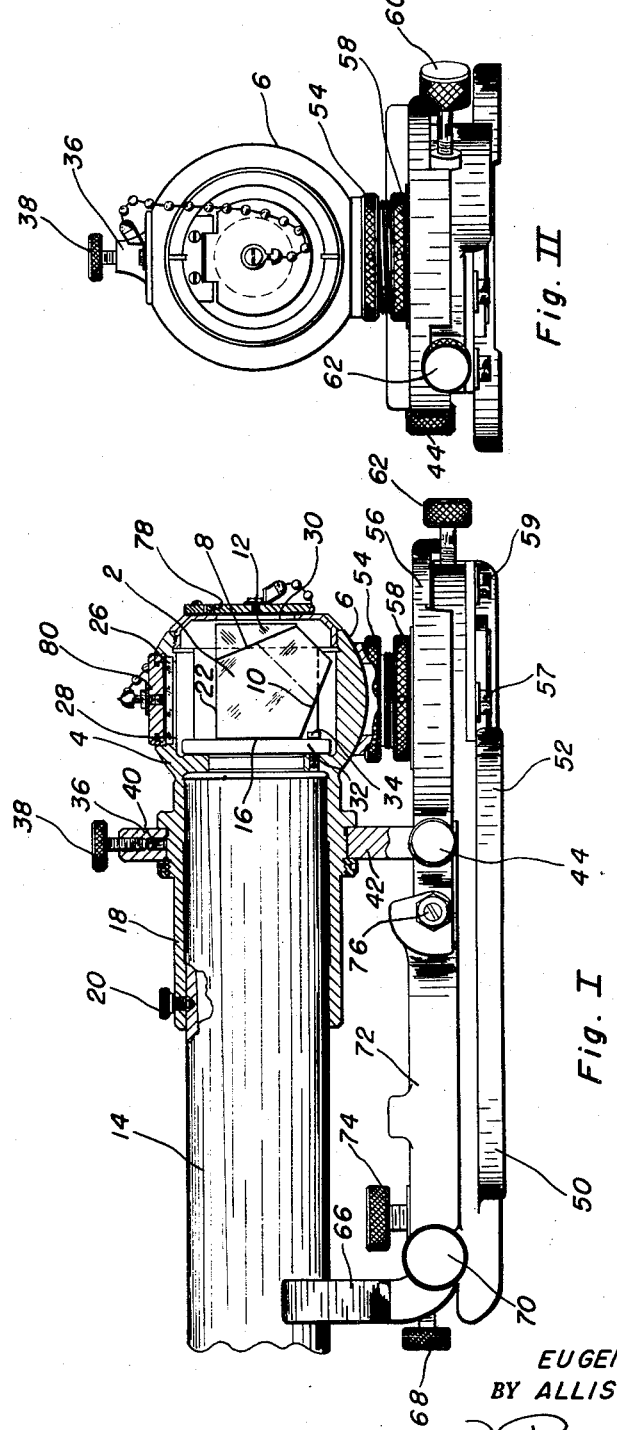
INVENTOR.
EUGENE V. MADES
BY ALLISTER L. BAKER
*ATTORNEY*

United States Patent Office 2,937,560
Patented May 24, 1960

2,937,560

OPTICAL SQUARE

Eugene V. Mades, East Orange, and Allister L. Baker, Denville, N.J., assignors to Keuffel & Esser Company, Hoboken, N.J., a corporation of New Jersey Filed May 5, 1955, Ser. No. 506,184

6 Claims. (Cl. 88—14)

This invention relates to an optical instrument useful for optical tooling and to a method of optical tooling. More particularly, it relates to an optical instrument which can locate points in a plane perpendicular to a given line of sight through a given point.

Optical tooling can be described in a general way as in-door surveying used for the alignment of jigs and fixtures for the assembly of large structures such as aircraft and the like. In this field, it is customary to establish a line of sight as a base line and to locate various assemblies with respect to this base line. The base line may be established by sighting a telescope at a target or collimator. For example, an alignment telescope such as the telescope shown and described in copending application Serial No. 294,652, filed June 20, 1952, now Patent No. 2,784,641, issued March 12, 1957, may be used for this purpose although any telescope with focusing means within the range and accuracy desired could be used. In locating parts with respect to the base line of sight established by such a telescope it is very often necessary to locate a point or points in a plane perpendicular to the base line of sight at a given distance along the base line. This can be accomplished by means of a jig transit. One method of doing this is described in copending application Serial No. 285,510, filed May 1, 1952, which issued as Patent No. 2,774,275, on December 18, 1956. This latter application discloses a jig transit with a reflector mounted at one end of the axle for the telescope. By using auto-collimation or auto-reflection the line of sight on the main telescope is directed at this mirror and the jig transit is adjusted until the image as seen through the main telescope comes back on its axis indicating that the axle of the jig transit is parallel to the base line of sight. The plane swept by the telescope of the jig transit is then perpendicular to the base line of sight. The distance along the base line of sight can be measured by a measuring button provided on the jig transit.

The instrument of the present invention serves the same general purpose as the jig transit but where conditions permit it is much simpler and rapid in use. It does not require the tedious adjustment which must be made by means of the leveling screws on the jig transit.

The principal objects of this invention are to provide an optical instrument and method which will generate a plane perpendicular to a given line at a given distance measured parallel to the given line in a very simple and efficient manner.

Basically, the invention is achieved by providing a penta prism 2 within a hollow sphere and positioning the penta prism so that the center of the sphere lies at the effective optical center of the penta prism. In the ideal case this will be achieved when the center of the sphere lies in the plane bisecting the dihedral angle between the reflecting surfaces of the penta prism. The sphere may be held in a suitable mount to permit adjustment of one of the light transmitting surfaces of the prism perpendicular to the fixed line of sight and to permit rotation of the prism about the line of sight as an axis to generate a plane perpendicular to the line of sight. Due to imperfections which may exist in any penta prism, it may be necessary to deviate slightly from the ideal condition which has just been defined and to provide certain additional adjusting elements in order to achieve the same desired results. The exact nature of the invention will be more fully understood from the following in which:

Fig. I is a view in sectional elevation of the new optical instrument which will be referred to hereinafter as an optical square and which is shown attached to the barrel of an alignment telescope and mounted on an adjustable device.

Fig. II is a view in end elevation of the instrument and associated apparatus as shown in Fig. I.

Referring to the drawings, the penta prism 2 is secured within a mount 4 provided with a spherical external surface 6. The prism is positioned with respect to said spherical bearing surface 6 so that the center of the sphere lies in the plane bisecting the dihedral angle between the reflecting surfaces 8 and 10 of the prism 2. An optical wedge 12 is cemented on to the reflecting surface 8 of the penta prism 2. Reflecting surface 8 is made a partially reflecting surface and the optical wedge 12 is constructed with extreme precision so that it is possible to look directly through the prism 2 and the wedge 12 without deviation of the line of sight of the telescope which in the embodiment shown is carried within the tube 14.

The light transmitting surface 16 of the penta prism 2 should be located perpendicular to the line of sight of the telescope 14 in order that no displacement will take place when looking straight through the prism 2 and wedge 12. This is accomplished in the embodiment shown by the tube 18 which is an integral extension of mount 4 carrying the penta prism 2. The prism is mounted so that the light transmitting surface 16 is perpendicular to the axis of the tube 18. Tube 18 is made to accurately fit the outside diameter of the tube 14 which is coaxial with the line of sight of the telescope. The set screw 20 holds the tube 18 on the tube 14 when the optical square is in use. The accuracy of the construction of the surface 16 perpendicular to the line of sight may be checked by turning the tube 18 and the telescope 14 about the line of sight of the telescope while the telescope is sighted at a near target. There should be no movement of the image of the target with respect to the reticle of the telescope.

The other light transmitting surface 22 of the penta prism is theoretically perpendicular to the surface 16 and is adjacent a light transmitting opening in the mount 4. This opening is filled with a window 26 which may be in the form of an optical wedge. If the penta prism 2 is not optically perfect, the wedge 26 may be rotated around its optical axis so that the line of sight of the telescope is deviated exactly 90° in the plane of the drawing of Fig. I by the combination of the penta prism 2 and the window 26. The window 26 is held in the mount 4 by the clamping ring 28.

A second light transmitting opening 30 is provided in the mount 4 adjacent the free surface of the wedge 12. This opening is used when sighting directly through the optical square. It would be difficult to use an adjustable wedge in the light transmitting opening 30 because the line of sight of the telescope must remain undeviated when sighting through the optical square. In order to accomplish this at least 2 wedges would be required. It has been considered simpler to make the combination of the penta prism 2 and the optical wedge 12 very precisely in this respect so that no adjustment is necessary. If the glass used for the penta prism 2 and the glass for the wedge 12 have exactly the same index of refraction and if the cement film between these two elements is uniform in thickness and optical properties, the outer surface of the wedge should be exactly parallel to the opposite light transmitting surface of the penta prism. If the optical properties of these materials are not exactly uniform, the surfaces will not be exactly parallel in order to achieve the desired result. However, in order to simplify the description, hereinafter, these surfaces will be defined as parallel, it being understood that this minor deviation from parallelism may exist in order to obtain the accuracy required.

The inner mount 32 which holds the penta prism 2 is in the form of a right angle. One side of the right angle is secured to a matching surface provided within the spherical mount 4 by three screws 34 as shown. The other side of the angular mount 32 lies parallel to the plane of the paper and the lower surface of the penta prism 2 is cemented thereto. The plane perpendicular to the line of sight of the telescope which is formed by the projection of the line of sight at 90° by the penta prism as the optical square is turned about the axis of the telescope can be made to pass through the center of the spherical surface 6 by sliding the mount 32 against its mounting surface within the mount 4. The holes through which the screws 34 pass are made oversize to permit this. For example, if the mount 32 and prism 2 as seen in Fig. I, are slid vertically upward, the generated plane moves to the right.

A ring 36 is mounted over the tubular extension 18 and may be clamped thereto by turning the screw 38 which forces the shoe 40 against the extension 18. A tongue 42 extends from the bottom side of the ring 36 between a pair of screws 44 which are carried in the auxiliary adjusting bracket 50.

The adjusting bracket 50 is only included in order to illustrate the use of the optical square. It will be appreciated that the optical square can be used with other types of adjusting brackets and other devices or adjusting means.

The adjusting bracket 50 is provided with a base 52. The base 52 is provided with a flat lower surface which is adapted to be held against the outer surface of a beam or other structural member of a fixture by means of bolts which are not shown. This bracket may be permanently left in position on a jig at a station point which is continuously used for the location of parts or it may be moved about on the jig as various parts are located depending upon the particular assembly operation.

An adjustable collar 54 is carried over the base 52 and is provided with a socket providing a complementary bearing to receive the spherical outer surface 6 of the prism mount 4. The height of the collar 54 over the base is adjusted by the threaded portion which extends outwardly therefrom into the adjustable plate 56. The height adjustment is locked by means of the locking nut 58. The adjustable plate 56 is also adjustable along the direction of the telescope line of sight and in the direction perpendicular to the plane of the drawing of Fig. I after loosening the lock nuts 57 and 59. This is accomplished by the adjusting screws 60 and 62 which control the motion of wedge shaped metal pieces located inside the bracket and which urge the plate 56 in the desired directions against the action of springs. After adjustment the lock nuts 57 and 59 are re-tightened.

In addition, the combination of the telescope 14 and the optical square is angularly adjustable about three different axes. Rough adjustment about the line of sight of the telescope is achieved by loosening the clamp screw 38 and rotating the telescope and optical square in the Y bearing 66 and in the collar 54. For fine adjustment about this axis the clamp screw 38 is locked and the adjusting screws 44 are turned.

The combination is adjustable about the axis of the collar 54 by the adjusting screws 70 which act against both sides of the arm 72 which carries the Y bearing 66 for the telescope.

The combination is adjustable about an axis through the center of the spherical surface 6 and perpendicular to the plane of the drawing of Fig. I by means of the screw 74 which raises and lowers the arm 72 and the Y bearing 66 above the base 50 from the pivot points 76 which join the arm 72 to the adjustable plate 66. The clamp screw 68 must be loosened before turning the screw 74 and re-tightened after adjustment.

In any application of the optical square of the present invention, it will be necessary to set up a telescope so that its line of sight is parallel to a given line. This may be done in various ways. For example, the telescope may be sighted at a target and the line of sight adjusted to the required direction by adjusting both the target and telescope or the telescope may be sighted at a collimator to establish the direction of the base line of sight and the telescope and collimator adjusted to the required condition. If the telescope 14 is provided with auto-collimation or auto-reflection, the collimator is not necessary and it is only necessary to direct the line of sight at a mirror of high optical quality. The direction of the line of sight is then determined as perpendicular to the plane of the mirror and the auto-collimator and mirror are adjusted to bring this to the given desired direction.

The telescope 14 provided with the optical square as shown may be interposed in the line of sight of the telescope described above and adjusted to coincide with the established line of sight by making use of the adjustments described by bringing the line of sight of the telescope parallel to the beam of light from the collimator or perpendicular to the surface of the mirror or by sighting it back through the first telescope used as a collimator. Any of these adjustments can be made by viewing directly through the prism 2 and the wedge 12. The combination of the telescope and the optical square may then be rotated about the base line of sight after loosening the clamp screw 38 to locate various points in a plane perpendicular to the base line of sight and passing through the center of the spherical surface 6. As each point in this plane is located, it is possible to recheck the position of the line of sight of the telescope by looking through the prism 2 and the wedge 12 and the line of sight may be adjusted for each point if necessary.

Covers 78 and 80 may be provided as shown for the openings 24 and 30 so that the opening not in use can be covered up to avoid confusion from a double image.

The location of this plane along the line of sight is determined by the position of the collar 54 which depends upon the mounting of the base 42 of the adjustable bracket and the fine adjustment achieved by means of the screws 60 and 62. A scale or preferably a precise measuring tape may be mounted below the base 52 of the adjusting bracket extending in a direction parallel to the base line of sight. The telescope 14 and optical square may be turned around the base line of sight within the Y bearing 66 and the collar 54 until the opening 24 is aligned with the collar 54. The telescope will then be sighted directly on the precise measuring tape to determine the location of the plane swept by the optical square. If necessary, the location of this plane can be adjusted to any given distance as indicated on the scale. The positions at various distances measured parallel to the given base line are known in the art as various station points. Although the optical square as shown and described has been attached to the tube of a telescope in order to orient the surface 16 of the prism 2 perpendicular to the line of sight of the telescope, it should be realized that the optical square may also be mounted at a distance from the telescope on a suitable adjusting bracket. In the latter case, other means would have to be provided for aligning the surface 16 perpendicular to the line of sight of the telescope. This could be accomplished for example, by means of a removable mirror which could be temporarily mounted with its reflecting surface parallel to the surface 16 of the prism. By means of auto-collimation or auto-reflection, the line of sight of the telescope would then be made perpendicular to the surface of the mirror and the surface 16. The adjustable bracket for holding the optical square might then be made so that this condition would be maintained during the rotation of the optical square to generate a plane perpendicular to the line of sight of the telescope.

Having thus described the invention, what is claimed is:

1. An optical square for optical tooling comprising a mount receiving a telescope, said mount having an external spherical bearing surface, said surface having its center in the line of sight of said telescope for rotatable support in a complementary bearing socket whereby the mount and the telescope cooperating therewith may rotate about the axis of the telescope which includes the center of the external spherical surface, a penta prism mounted substantially centrally of said spherical mount, said external spherical surface having three light transmitting openings two of which are adjacent the light transmitting surfaces of said penta prism, one of the reflecting surfaces of said penta prism being a partially light transmitting surface, a glass wedge having two light transmitting surfaces at an angle to each other and cemented to said partially reflecting partially transmitting surface of said penta prism so that the other surface of said wedge will be adjacent the third opening and will be parallel to the opposite light transmitting surface of the penta prism whereby light passing through said one reflecting partially transmitting surface of said penta prism and through said wedge will not be deviated, said penta prism being positioned with respect to said spherical surface so that the line of sight of the telescope directed at the center of said sphere perpendicular to said opposite light transmitting surface of the penta prism will always be deviated 90° by said penta prism into a plane perpendicular to the line of sight of the telescope when the optical square is rotated about the center of the spherical surface and about the line of sight of the telescope, the mounting means of said prism retaining the light transmitting surface of said penta prism opposite said partially reflecting partially transmitting surface perpendicular to the line of sight of the telescope.

2. An optical square for optical tooling comprising a mount having a cylindrical recess for receiving a telescope, said mount having an external spherical bearing surface having its center concentric with the axis of said cylindrical recess for rotatable support in a complementary bearing socket whereby the mount and a telescope cooperating therewith may rotate about the axis of a telescope received in said cylindrical recess which axis includes the center of the external spherical surface, a penta prism mounted substantially centrally of said spherical mount, said external spherical surface having three light transmitting openings two of which are adjacent the light transmitting surfaces of said penta prism, one of the reflecting surfaces of said penta prism being a partially light transmitting surface, a glass wedge having two light transmitting surfaces at an angle to each other and cemented to said partially reflecting partially transmitting surface of said penta prism so that the other surface of said wedge will be adjacent the third opening and will be parallel to the opposite light transmitting surface of the penta prism and light passing through said one reflecting partially transmitting surface of said penta prism and through said wedge will not be deviated, said penta prism being positioned with respect to said spherical surface so that the line of sight of the telescope directed at the center of said sphere perpendicular to said opposite light transmitting surface of the penta prism will always be deviated 90° by said penta prism into a plane perpendicular to the line of sight of a telescope received in said cylindrical recess when the optical square is rotated about the center of the spherical surface and about the line of sight of the telescope, the mounting means of said prism retaining the light transmitting surface of said penta prism opposite said one reflecting partially transmitting surface perpendicular to the line of sight of the telescope.

3. The invention according to claim 1 in which the 90° deviated line of sight passes through the center of the sphere.

4. The invention according to claim 2 in which the 90° deviated line of sight passes through the center of the sphere.

5. An optical square for optical tooling comprising a penta prism within a mount provided with an external spherical surface, said mount having three light transmitting openings two of which are in line with the two light transmitting surfaces of said penta prism, one of the reflecting surfaces of said penta prism being a partially reflecting, partially transmitting surface, a glass wedge cemented to said partially reflecting, partially transmitting surface having its outer surface parallel to the opposite light transmitting surface of the penta prism so that light passing perpendicularly through said opposite light transmitting surface and through said wedge will not be deviated or displaced, the third light transmitting opening in said mount being in line with the outer surface of said wedge, a tube extending from said mount at the light transmitting opening therein which is in line with the light transmitting surface of said penta prism opposite said wedge provided with an internal cylindrical surface the axis of which passes through the center of said spherical surface for receiving a telescope to orient said light transmitting surface of the penta prism perpendicular to the line of sight of the telescope and a second optical wedge carried in the light transmitting opening in said mount parallel to the other light transmitting surface of said wedge, said second optical wedge being adjusted about its optical axis to correct any error in the 90° deviation angle of the penta prism and said penta prism being positioned with respect to said spherical surface so that the line of sight of the telescope directed at the center of said sphere perpendicular to a transmitting surface of said penta prism will always be deviated 90° by said penta prism into a plane perpendicular to its line of sight when the optical square is rotated on the spherical surface about the line of sight of the telescope.

6. An optical square for optical tooling comprising a penta prism within a mount provided with an external spherical surface, said mount having three light transmitting openings two of which are in line with the two light transmitting surfaces of said penta prism, one of the reflecting surfaces of said penta prism being a partially reflecting partially transmitting surface, a glass wedge cemented to said partially reflecting partial transmitting surface having its outer surface parallel to the opposite light transmitting surface of the penta prism so that light passing perpendicularly through said opposite light transmitting surface, through said partially reflecting partially transmitting surface and through said wedge will not be deviated or displaced, the third light transmitting opening in said mount being in line with the outer surface of said wedge, means for orienting the light transmitting surface of said penta prism opposite said partially reflecting partially transmitting surface perpendicular to the line of sight of the telescope and a second optical wedge carried in the light transmitting opening in said mount parallel to the other light transmitting surface of said wedge, said second optical wedge being adjusted about its optical axis to correct any error in the 90° deviation angle of the penta prism and said penta prism being positioned with respect to said spherical surface so that the line of sight of the telescope directed at the center of said sphere perpendicular to a transmitting surface of said penta prism will always be deviated 90° by said penta prism into a plane perpendicular to its line of sight when the optical square is rotated on the spherical surface about the line of sight of the telescope.

References Cited in the file of this patent

UNITED STATES PATENTS

| | | |
|---|---|---|
| 940,329 | Krell | Nov. 16, 1909 |
| 1,012,715 | Saegmuller | Dec. 26, 1911 |
| 1,722,209 | Gordon | July 23, 1929 |
| 1,744,994 | Von Hofe et al. | Jan. 28, 1930 |
| 2,285,768 | Drucker | June 9, 1942 |
| 2,451,409 | Petry et al. | Oct. 12, 1948 |
| 2,481,551 | Williams | Sept. 13, 1949 |
| 2,573,703 | Gardner | Nov. 6, 1951 |
| 2,692,527 | Wetzel et al. | Oct. 26, 1954 |

FOREIGN PATENTS

| | | |
|---|---|---|
| 726,535 | France | Mar. 7, 1932 |
| 800,097 | France | Apr. 20, 1936 |
| 504,783 | Germany | Aug. 9, 1930 |
| 509,279 | Great Britain | July 13, 1939 |